(12) United States Patent
Alessi et al.

(10) Patent No.: US 11,058,258 B2
(45) Date of Patent: Jul. 13, 2021

(54) COFFEE GRINDER-DOSER APPARATUS WITH INDEPENDENT FORK AND WEIGHING DEVICE WITH FEEDBACK

(71) Applicants: Riccardo Alessi, Bassano del Grappa (IT); Manuel Oddera, Fonte (IT)

(72) Inventors: Riccardo Alessi, Bassano del Grappa (IT); Manuel Oddera, Fonte (IT)

(73) Assignee: FIORENZATO M.C. SRL, Vigonza (PD) (IT)

( * ) Notice: Subject to any disclaimer, the term of this patent is extended or adjusted under 35 U.S.C. 154(b) by 393 days.

(21) Appl. No.: 15/993,996

(22) Filed: May 31, 2018

(65) Prior Publication Data

US 2018/0344088 A1 Dec. 6, 2018

(30) Foreign Application Priority Data

May 31, 2017 (IT) .......................... 102017000059436

(51) Int. Cl.
| | |
|---|---|
| *A47J 42/44* | (2006.01) |
| *G01G 13/16* | (2006.01) |
| *A47J 42/50* | (2006.01) |
| *A47J 42/40* | (2006.01) |
| *A47J 43/07* | (2006.01) |
| *G01G 13/24* | (2006.01) |

(52) U.S. Cl.
CPC .............. *A47J 42/44* (2013.01); *A47J 42/40* (2013.01); *A47J 42/50* (2013.01); *G01G 13/16* (2013.01); *A47J 2043/0733* (2013.01); *G01G 13/24* (2013.01)

(58) Field of Classification Search
CPC .......... A47J 31/42; A47J 31/40; A47J 31/404; A47J 42/44; A47J 42/40; G01G 13/16; G01G 13/24
USPC ................................ 99/286; 241/34, 36, 100
See application file for complete search history.

(56) References Cited

U.S. PATENT DOCUMENTS

| | | | |
|---|---|---|---|
| 5,386,944 A | 2/1995 | Knepler et al. | |
| 5,522,556 A | 6/1996 | Knepler et al. | |
| 6,783,089 B2 | 8/2004 | Lassota | |
| 9,296,603 B1* | 3/2016 | Cole | B67D 7/36 |

(Continued)

FOREIGN PATENT DOCUMENTS

| | | | | |
|---|---|---|---|---|
| CA | 2897605 A1 * | 1/2016 | ........... | B25B 27/064 |
| EP | 2694216 A1 | 2/2014 | | |

(Continued)

*Primary Examiner* — Reginald Alexander

(57) ABSTRACT

Electronic grinder-doser apparatus of the type with weight control or "grind-by-weight", intended to grind and precisely dose coffee in beans dispensing the ground product in a filter-holding bowl for espresso coffee. Implemented is a dose compensated weighing system, of the multi-cycle and feedback type at every cycle, carried out by a device with a load cell and specific execution programs. The cell is interposed between the machine body and a base shaped in such a way as to integrate the centering fork of the bowl, making the hooking independent. The specific programs execute each grinding and dispensing cycle with a double weighing and automatic calibration, according to an Algorithm A comprising 4 steps (AF1-AF4) and a Filtering Algorithm B. The apparatus is suitable for professional daily use and helps the operator, by automatically calibrating during use.

5 Claims, 3 Drawing Sheets

(56) References Cited

U.S. PATENT DOCUMENTS

2011/0256273 A1* 10/2011 de Graaff ................ G01F 11/46
                                                          426/112
2016/0143481 A1   5/2016 Merelli

FOREIGN PATENT DOCUMENTS

| EP | 3097831 A1 | 11/2016 | |
|----|------------|---------|---|
| EP | 3167782 A1 | 5/2017 | |
| WO | WO-2005090163 A1 * | 9/2005 | ............ G01G 13/16 |
| WO | 2015006244 A1 | 1/2015 | |
| WO | 2016071826 A1 | 5/2016 | |

* cited by examiner

COFFEE GRINDER-DOSER APPARATUS WITH INDEPENDENT FORK AND WEIGHING DEVICE WITH FEEDBACK

CROSS-REFERENCE TO RELATED U.S. APPLICATIONS

Not applicable

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON A COMPACT DISC

Not applicable.

FIELD OF THE INVENTION

The present invention relates to an electronic apparatus for grinding and precisely dosing coffee in beans, provided with an independent fork for centering and supporting the filter-holding bowl, which integrates an automatic real-time weighing device for weighing the dose with feedback. Moreover, a weighing system of the multi-cycle type with feedback, for continuous automatic calibration, is also described.

DESCRIPTION OF RELATED ART

The invention finds particular, although not exclusive, application in the industrial sector of professional bar equipment for making espresso coffee.

In general, the professional machines for making espresso, which are conventionally called coffee machines, which substantially include a body comprising a boiler that generates hot water and steam sending them to one or more dispensing units for the purpose of crossing a corresponding number of filter-holding bowls containing the ground coffee, are widely known. They thus need to be previously filled in the filter with the coffee powder in a specific machine intended to grind and precisely dose it, which is also called grinder-doser apparatus. In particular, said filter-holding bowl must be filled with the exact quantity of coffee powder depending on the number of doses to be dispensed and on the quality provided; in general, in professional use, one or two doses are provided, in such a way as to prepare one or two cups of espresso coffee.

In a grinder-doser apparatus the coffee beans falling from a cone-shaped container arranged above the machine's main body are ground in such a way that the powder in microgranules is collected and correctly dispensed inside said bowl. In the professional sector grinder-doser apparatuses of the conventional or automatic type are used, wherein the former have a gate lever switch, which substantially allows the user to control how much and how to grind coffee, while the latter are provided with push-buttons and/or sensors that automatically control dispensing upon reaching a given threshold.

Said electronic grinder-dosers advantageously limit the operations by the operator who, sequentially, only has to position the bowl corresponding to the desired dose and then select said dose. Generally, the quantity of coffee relating to one or two doses is previously set by setting the parameters corresponding to the duration of grinding, that is to say, to the time of operation of the motor, which is necessary to dispense the desired weight of the ground product; these grinding systems are also known as "grind-by-time" systems.

In some more evolved systems, which are also known as "grind-by-weight" systems, on the other hand, the grinder-doser apparatus comprises a weighing device that, during grinding, continuously measures the weight of the coffee dispensed in such a way as to automatically stop the motor upon reaching the programmed weight. For example, among the known systems for detecting weight in real time, see the solutions as in documents U.S. Pat. No. 5,386,944 (Knepler et al.) and U.S. Pat. No. 6,783,089 (Lassota), wherein an electronically controlled weighing device is arranged below the container intended for collecting the ground food, as a support base; moreover, see the coffee grinder-doser for household use that integrates in the base a highly sensitive device, which directly detects the weight of the container of ground powder, as in the solution called Forté by the U.S. company Baratza LLC—www.baratza.com.

Furthermore, among the conventional solutions of the grind-by-weight type, see the weighing devices of the overhanging type, as for example in U.S. Pat. No. 5,522,556 (Knepler et al.), wherein a coffee grinder-doser integrates a weighing means below the mobile arm that supports the collection container, it being protruding and vertically oscillating, in such a way as to instantaneously detect the weight of the ground and dispensed coffee, which is thus automatically compared with the programmed weight of the single dose, stopping the motor when such weights correspond. Otherwise, see the recent solution called Sette 270W by said company Baratza LLC—www.baratza.com, which provides the integration of an overhanging weighing system directly connected to the supporting fork of a filter-holding bowl for espresso coffee; said weighing system is highly sensitive and has a high response speed, and is included inside the machine body of a coffee grinder-doser apparatus for household use, in such a way as to detect during dispensing the variations in weight on said fork that protrudes on the front below the dispenser, it also being connected to the motor control system to stop grinding upon reaching the desired weight.

Finally, in the professional sector, it was observed that, by using conventional devices of the grind-by-time type, it is extremely important to adjust every time and with precision the grinding time for the purpose of obtaining the exact quantity, in weight, of actually ground coffee, that is to say, the desired dose weight in grams. In fact, it is not constant but it is variable depending on the granulometry and on the type of coffee used, on the wear of the machine and, in particular, on environmental conditions among which humidity and temperature. Basically, in the conventional solutions of the grind-by-time type the duration of grinding is fixed, it being set with the initial setting of the apparatus, whereas the actually dispensed dose is every time slightly greater or smaller with respect to the desired weight, depending on said parameters. Therefore, in order to correctly compensate for such variations, professional operators must control the weight of the dose, as a control periodic sampling, otherwise an automatic calibration system can be provided.

In more detail as to said calibration, the operators of the sector are aware of some weighing systems with the motor off, that is to say, after grinding has been completed, aimed at adjusting duration; basically, said calibration occurs with the check of the weight of the actually dispensed dose by an apparatus of the type called "grind-by-time", in such a way that, if considered necessary, the operator can consequently modify the grinding time. In general, to this purpose, all the manual systems providing a simple device, of the independent scales type, that is to say, separate from the grinder-doser apparatus, for the sporadic control of the weight of the single dose dispensed are considered as inconvenient and imprecise; on the other hand, the electronic weighing systems, which are integrated in the apparatus and connected to its control system, are considered as more effective and useful in the professional sector.

Among them, see for example the semi-automatic calibration system as in document EP3097831 (Oddera) wherein, below the dispenser, on a support plane for the container for collecting the ground coffee like sampling, a modern load cell is integrated, which is electrically connected to the logic control unit that manages the motor of the apparatus, in such a way as to perform multiple control weighings in sequence with following automatic processing with compensated calculation and self-adjustment, wherein the grinding times are automatically re-set Such a semi-automatic adjustment process is basically a sampling system with multiple detections, carried out separately with respect to the ordinary operations.

All things considered, professional operators consider the electronic grinder-dosers of the grind-by-time type as constructively simpler and cheaper but, with use, they tend to be little precise in the dispensing of the desired dose weight in grams, requiring continuous controls and calibration of said grinding duration, as explained above. In principle, on the other hand, said apparatuses of the grind-by-weight type are more precise, since they are based on the precise weight of the dispensed dose. However, they are more delicate due to the extreme sensitiveness of modern weighing electronic devices, such as the load cells, and they are often imprecise in the dispensing of the desired dose weight in grams due to grinding inertia after the motor has been switched off and/or to the powder accumulated in a non-uniform way in the dispenser, or anyway in the path between the grinder and the filter-holding bowl.

Moreover, the problem of the vibrations of the motor during weighing has not been solved in an optimal way yet, the load cell being intended to detect minimum weight variations, such as of a few grams and/or gram fractions, with the motor on, that is to say, with the grinders in operation. Furthermore, sometimes the weighing precision of a modern load cell can also be jeopardized by the repeated impacts to the device accidentally caused by professional operators during the operation of hooking/release of the filter-holding bowl to/from the supporting fork; such impacts, in fact, progressively decalibrate the device or damage it in an irreversible way. Such an event is thus more likely to occur when said load cell is directly connected to the fork, as for example occurs in said overhanging solutions, or is integrated in the body of the apparatus. Finally, it has been experimentally observed that said highly sensitive load cells tend to decalibrate during ordinary use as well, that is to say, in the absence of impacts, it being necessary to periodically calibrate them again anyway.

For the purpose of determining the prior art related to the proposed solution, a conventional check was made, searching public archives, which has led to find some prior art documents, among which:
D1 EP2694216 (Rego)
D2 WO2015006244 (Rego)
D3 US2016143481 (Merelli)
D4 WO2016071826 (Conti)
D5 IT102015000071452 (Oddera)

D1 proposes a coffee grinding apparatus of the professional type provided with an electronic weighing device for dosing and displaying the quantity of coffee that is ground and dispensed directly in the portafilter, measuring its weight variation; said weighing device is coupled with a platform that protrudes like a peninsula below the dispenser, being directly connected to the control system of the apparatus and also interfacing with a remote display for displaying the measured value and with a portafilter equipped with digital controls.

D2 describes a weighing device for coffee grinder-dosers wherein the load cell is integrated in a safety base in such a way that the supporting fork of the portafilter rests on it, also with a stroke stopping system intended to protect said cell from accidental impacts.

D3 proposes, on the other hand, a weighing device integrated in an overhanging way in a grinder-doser apparatus with the dispensing duct connected to the grinding unit to dispense coffee inside a filter-holding bowl, wherein the supporting fork is L-shaped and is connected in an overhanging way to a load cell, which directly weighs the quantity of ground coffee contained in the filter and sends this value to the control unit of the apparatus in such a way as to stop the grinding unit when the weight of the ground coffee contained in the filter is equal to the programmed dose. The invention also relates to the programming of said cell in such a way as to detect a slightly smaller quantity of coffee with respect to the programmed dose, considering that, after the motor has been stopped, some ground coffee powder is dispensed anyway.

D4 describes a weighing device integrated in a grinder-doser apparatus provided with a transit front body with an internal cochlea, acting as a dispensing compartment, which is directly connected to the weighing device in such a way as to detect the variations in weight of the whole front compartment. To this purpose, a load cell is vertically interposed between the machine body and said front compartment, detecting its weight and to operate the motor, depending on the single dose or to fill said front compartment, or to operate said cochlea and dispense the dose with the grinders off.

D5 proposes an electronic grinder-doser apparatus of the conventional type called "grind-by-time", which is also provided with a system for the control and continuous and automatic calibration of the actually dispensed dose, wherein at the end of dispensing a modern weighing device with a load cell detects the weight of the actually dispensed doses and consequently re-calculates the correct duration of grinding; said cell is of the single point type with a horizontal load plane and is positioned between the base and the machine body as it is conventionally shown in the prior art figure (FIG. 1), or is integrated below the cone for the coffee beans, in such a way as to progressively detect its weight loss.

To conclude, it is reasonable to consider as known:
a grinder-doser apparatus of coffee in beans coupled with
   manual or electromechanical means for dosing the quantity of product ground and dispensed in the filter-holding bowl, in one or two doses;

an electronic grinder-doser apparatus wherein the dose weight in grams is measured during dispensing, wherein the coffee is ground and weighed directly with its operating container, or filter-holding bowl, by means of a weighing device that is coupled with it and connected to the logic control unit in order to automatically stop grinding upon reaching the pre-set weight, being thus of the type called "grind-by-weight";

an electronic grinder-doser apparatus of the grind-by-weight type wherein the weighing device is placed outside the machine body like an island, or peninsula protruding from the base, or is positioned in an overhanging way in connection to the supporting and centering fork of the bowl, or, also, it is interposed between the motor compartment and the front compartment intended for dispensing in order to detect the weight of said compartment only.

a weighing device for an electronic grinder-doser apparatus of the grind-by-weight type comprising a load cell connected in an overhanging way to the supporting fork of the bowl and also programmed in such a way as to detect a quantity of ground product that is smaller with respect to the desired value, considering that an amount of product is dispensed in any case after interruption;

an electronic grinder-doser apparatus of the grind-by-time type provided with a system for the control and manual or semi-automatic calibration of the actually dispensed dose, wherein it is provided to take a dose or a progressive series of ground doses like separately weighed samples, for a manual change of the setting, that is to say, by progressive approximations, or storing the detected values in a system that automatically makes the calculation and the adjustment;

an electronic grinder-doser apparatus of the grind-by-time type provided with a system for the control and continuous and automatic calibration of the actually dispensed dose, wherein at the end of dispensing a load cell placed below the machine body, or below the cone, detects the weight of the actually dispensed doses and consequently re-calculates the correct duration of grinding.

In general, the above-described solutions aim at overcoming the known difficulty experienced daily by professional operators in obtaining from the grinder-doser the precise quantity of actually ground and dispensed coffee, that is to say, the desired dose weight in grams; all the known and conventional solutions, however, have some disadvantages or unsolved problems.

Firstly, it was observed that the apparatuses provided with an electronic weighing system are very delicate, being generally unsuitable for professional use with said filter-holding bowls for espresso coffee; sometimes, in fact, they are imprecise in the dispensing of the desired dose weight in grams, that is to say, they are little effective. This happens due to the multiple above-mentioned causes, considered individually or combined with each other, and namely: the high sensitiveness of a modern load cell, the grinding inertia after switching-off, the accumulation of the coffee powder in the path between the grinder and the filter-holding bowl, the vibrations of the motor during weighing, the accidental impacts and/or the progressive decalibration of said cell.

Secondly, it was observed that some of the above-mentioned problems could be partially solved by releasing from the machine body the hooking of the filter-holding bowl, wherein the weighing device is coupled with a platform that protrudes like an island below the dispenser, as for example in D1 and D2. The known solutions of the island type, however, are not considered as suitable and effective for professional use specifically dedicated to the serving of espresso coffee. In fact, it was noticed that the solutions of the island or peninsula type, in the form of a weighing plate electronically connected to the grinder-doser apparatus, are suitable to detect the weight of containers in a direct bearing condition that is to say, for the dispensing of large quantities as it occurs in retail or in infusion coffee, while they are not suitable for the rapid hooking of said filter-holding bowls that are conventionally used in bars and restaurants, which are bulky and provided with a handle that protrudes horizontally for rapid hooking integral with an overhanging supporting fork, repeated many times every day.

In particular, the solutions that integrate a weighing means outside the machine body can experience the above-mentioned problems of impacts on the cell, of the non-standardized hooking that is not integral with the machine body, of the distance from the dispenser and of the non-barycentric weighing with respect to the cell. D2 proposes an improved shape of a weighing plate with a fork, intended to protect the weighing means from impacts by means of a structure with interlocking mobile parts, vertically interpenetrating like a stroke stopping system; this solution, however, is constructively complex and expensive and does not solve completely the problem of completely isolating the load cell from the hooking of the bowl and from possible impacts.

Thirdly, it was observed that in the apparatuses provided with an electronic weighing system inside the machine body and directly connected to the fork, as for example occurs in said overhanging solutions among which in D3, the various problems mentioned above are more relevant; moreover, when the weighing device is integrated close to the motor and/or to the grinders, as for example occurs both in D3 and in D4, sometimes one can observe accidental impacts and/or vibrations and/or decalibration of the load cell in such a way as to jeopardize the operating effectiveness thereof. Even the improved solution as in D4, which is intended to completely release the supporting fork of the bowl from the weighing device with a load cell interposed between a front body acting as a dispensing compartment and the machine body, is not considered as satisfactory because said cell works in a non-optimal way for continuous and lasting professional use in time, it being subject to non-barycentric, that is to say, overhanging, loads, and anyway near the motor, of the grinders and also of the cochlea inside said front body.

Fourthly, it was observed that some known solutions consider, in weight detection, the amount of ground product that is dispensed anyway after the motor has been stopped, this being a relevant problem in calculation, which is widely known to professional operators; however, to this day a way of calculating said amount precisely is not known yet. For example, in D3 one considers in an indefinite way a smaller quantity of ground powder with respect to the desired dose, that is to say, without specifying such a reduction.

More generally speaking, in all the solutions in which the ground product is weighed during dispensing, the problem of the tight tolerances of the weighing devices was observed, it being necessary to measure dynamically and precisely the variations in weight relating to minimum quantities of product, that is to say, between 7 and 7.5 grams for the single doses, therefore a very precise and sensitive weighing device is necessary, which is able to eliminate the vibrations of the moving members.

Moreover, it was also observed that said grinder-doser apparatuses progressively tend to decalibrate, and even more in the presence of impacts and/or vibrations, it being anyway necessary to introduce an efficient calibration system. In more detail, in the known and conventional solutions it was observed that for the control of the dispensed dose, that is to say, the calibration of the grinder-doser apparatus and/or of the weighing device, the operator must interrupt ordinary dispensing in such a way as to manually take samples of ground coffee, detect their exact weight and consequently calibrate the apparatus; furthermore, a direct control is provided on the load cell to check its effectiveness. Such known solutions, although effective in the final adjustment of the apparatus, are however complex in their execution and require considerable attention and preparation by the operator. To this day, an electronic coffee grinder-doser apparatus of the grind-by-weight type, for espresso coffee filter-holding bowls, which also performs said calibration with high precision and in complete autonomy, during ordinary operation, is not known and is widely desirable in the professional sector.

Finally, it was observed that the most evolved systems for the control and continuous and automatic calibration of the actually dispensed dose, as for example in D5, make the detections with the motor off, they being for grinder-doser apparatuses of the grind-by-time type wherein said problems linked to accidental impacts and/or to vibrations are not considered, and there is also a different weighing arrangement with respect to the present invention; in fact, they provide to re-calculate the duration of grinding on the basis of the weight loss of the coffee in beans considering the averages of multiple progressive detections made at the end of dispensing, with the motor off and without the filter-holding bowl hooked to the machine body. The positioning of the load cell below the machine body, in the proposed mode, is effective only in a barycentric arrangement with the motor off, on the other hand it would not be effective in a continuous detection system aimed at controlling each dispensing, with the grinders in operation and the bowl hooked, as it occurs in an apparatus of the grind-by-weight type.

All things considered, there is the need for the companies of the sector to find some innovative solutions able to overcome at least the above-mentioned problems.

BRIEF SUMMARY OF THE INVENTION

These and other aims are achieved by the present invention according to the characteristics as in the appended claims, solving the above-mentioned problems by means of an electronic grinder-doser apparatus (10) of the weight-control or grind-by-weight type, able to grind and precisely dose coffee in beans dispensing the ground product in a filter-holding bowl (200) for espresso coffee; the invention implements a dose compensated weighing system, of the multi-cycle and feedback type at every cycle, carried out by a device (116) with a load cell (103) and specific execution programs (117). Said cell is interposed between the machine body (105) and a base (102) shaped in such a way as to integrate the centering fork (113) of the bowl, making the hooking independent; said specific programs (117) execute each grinding and dispensing cycle with a double weighing and automatic calibration, according to an Algorithm A comprising 4 steps (AF1-AF4) and a Filtering Algorithm B. The apparatus (10) is suitable for professional daily use and helps the operator, by automatically calibrating during use.

In this way, by the considerable creative contribution the effect of which constitutes an immediate and important technical progress, various important aims are achieved.

A first aim was to realize an electronic apparatus for grinding and dosing coffee in beans, of the grind-by-weight type, wherein the weighing device provides a modern highly sensitive load cell that is released from the supporting fork of the bowl and is placed outside the machine body, in such a way as to work on the plane in a substantially barycentric way, that is to say, not in an overhanging way. As a consequence, the hooking of the bowl, too, is released from said machine body, protecting it from impacts, torsions, accidental stresses and/or overhanging loads; to this purpose, the supporting fork is preferably made integral with the base below the cell, yet having the same shape and hooking positioning in such a way as not to modify the conventional ways of use of the fork and bowl.

A second aim was to consider and compensate in the detection, in a precise and reliable way, for said amount of product dispensed after the motor has been switched off, that is to say, due to grinding inertia and/or due to a non-homogenous accumulation in the path between the grinder and the filter-holding bowl; said amount of product being conventionally called residual amount in the description of the present invention, it being referred to said path or trajectory of the powder.

A third aim was to consider and compensate in the detection, in a precise and reliable way, for the vibrations of the machine body and/or for the other disturbances that may possibly occur with the motor on.

A fourth aim was to realize an apparatus provided with an automatic dose calibration system, for an always precise and effective dispensing of the ground product; therefore, professional activity is facilitated and overall costs are reduced. In particular, the aim is to realize an electronic coffee grinder-doser apparatus of the grind-by-weight type, for professional use and with espresso coffee filter-holding bowls, which performs said calibration with high precision and in complete autonomy, during ordinary operation, in such a way as to continuously re-calibrate depending on the actually dispensed doses, getting as close as possible to the desired dose weight in grams in any operating condition, and eliminating periodic interruptions.

A fourth aim, linked to the previous one, was to eliminate any intervention by the operator, thus reducing the occasions for distraction, fatigue or human error.

A further aim of the invention was to ensure reliability of the detections and a constant dispensing stability, for professional use: in particular, the proposed weighing system is suitable for the modern electronic grinder-doser apparatuses that are combined with bar devices for the extraction of espresso coffee, thus using the conventional filter-holding bowls with a handle.

An additional aim of the proposed system is to enable the optional integration of said weighing system, with minimum interventions, also in the electronic grinder-doser apparatuses currently widespread in the professional sector, being of strong and simple construction as well as effective in grinding and in dispensing, that is to say, safe in the electromechanical operation and appreciated by the operators. In fact, it is provided to integrate the load cell outside the machine body, that is to say, at the base of the apparatus, below it, in a barycentric position and isolated from the filter-holding bowl; said cell is thus electronically connected to the logic control unit of the apparatus, wherein the execution programs of the weighing and control system are specifically included, with compensated calculation algorithms as well.

Therefore, as a whole, the present invention discloses an improved and constructively simplified weighing and calibration system, with a good technological content as well; the invention, moreover, is cost-effective and can be produced in large quantities by means of the modern industrial processes.

These and other advantages will be evident from the following detailed description of a preferred solution with reference to the enclosed drawings.

DETAILED DESCRIPTION OF THE INVENTION

Figure 1:
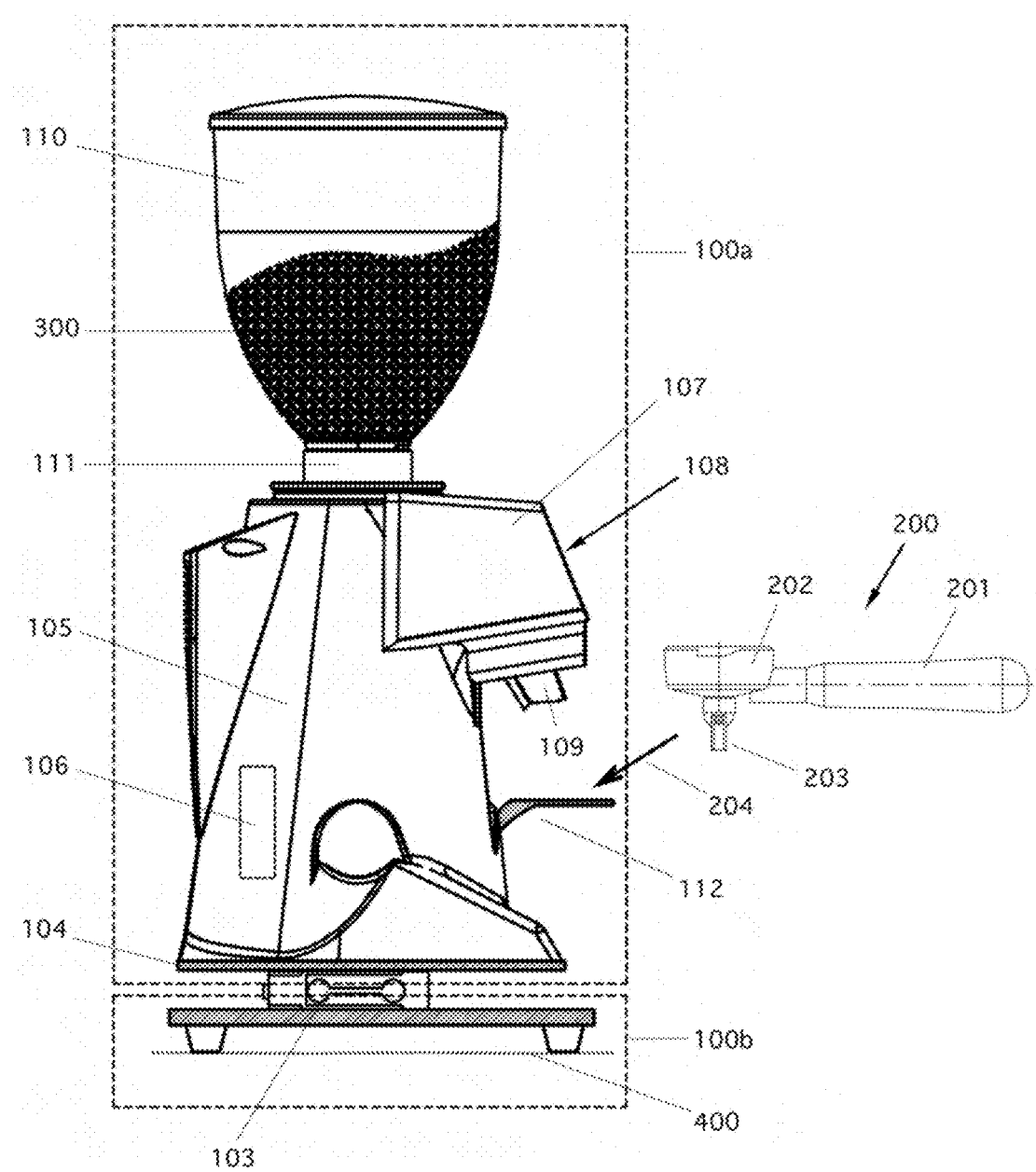
FIG. 1 is a side view of a conventional electronic grinder-doser apparatus of the grind-by-time type, which is also provided with a continuous and automatic calibration system by means of a load cell positioned between the base and the machine body in such a way as to progressively detect the weight loss of the coffee in beans; the upper part of the apparatus, comprising said machine body, and the lower part comprising the base, are schematically delimited by a dotted line.

With reference to the drawings (FIGS. 2, 3a, 3b), the proposed invention relates to an electronic grinder-doser apparatus (10) of the type with weight control, called "grind-by-weight", which is intended to grind and precisely dose coffee in beans (300) dispensing the ground product (301) in a filter-holding bowl (200, 202) for espresso coffee. Said apparatus (10) integrates an advantageous weighing device (116) that comprises a load cell (103) and specific execution programs (117), said cell being interposed between the machine body (105) and a particular base (102) shaped in such a way as to integrate the centering fork (113) and make the hooking of said bowl (200) independent. The invention allows to automatically dispense in the filter, for each dose, the always exact dose in grams of coffee powder (301).

In particular, at each grinding and dispensing cycle the product is weighed at least twice: the first time directly during dispensing, in such a way as to stop the motor also keeping into account the variable quantity of product that is dispensed anyway after the motor has been switched off, which is conventionally called residual amount (QV), and a second time at the end of dispensing, that is to say, with the motor off, detecting the actually dispensed weight (PE) of the dose. Such values (QV, PE) are thus automatically re-calculated and consequently re-set by the apparatus (10), for the following cycle, on the basis of the variance (SC) detected with respect to the required weight (PR). Said weighings and the consequent automatic calibration are advantageously managed by means of said specific execution programs (117), which are preferably included in the logic unit (106) that simultaneously checks all the electromechanical and electronic components of the apparatus, among which the motor and the load cell, which are interconnected with each other.

The grinder-doser apparatus (10) disclosed by the invention (FIG. 2) is of the electromechanical type with electronic control, conventionally called electronic grinder-doser, which integrates a weighing device of the electronic type with at least one load cell (103) which is intended to autonomously and precisely detect the exact weight loss of the mass resting on its load plane. Structurally, the apparatus (10) is made up of two main parts (101, 102), that is to say, an upper part (101) of the complex type and a lower part of the single-piece type formed by a shaped base (102), wherein said cell is interposed between them in such a way as to progressively detect the variation in weight of said upper part (101), during and after dispensing, in a substantially barycentric way and without being affected by impacts or by any external stress.

Figure 2:
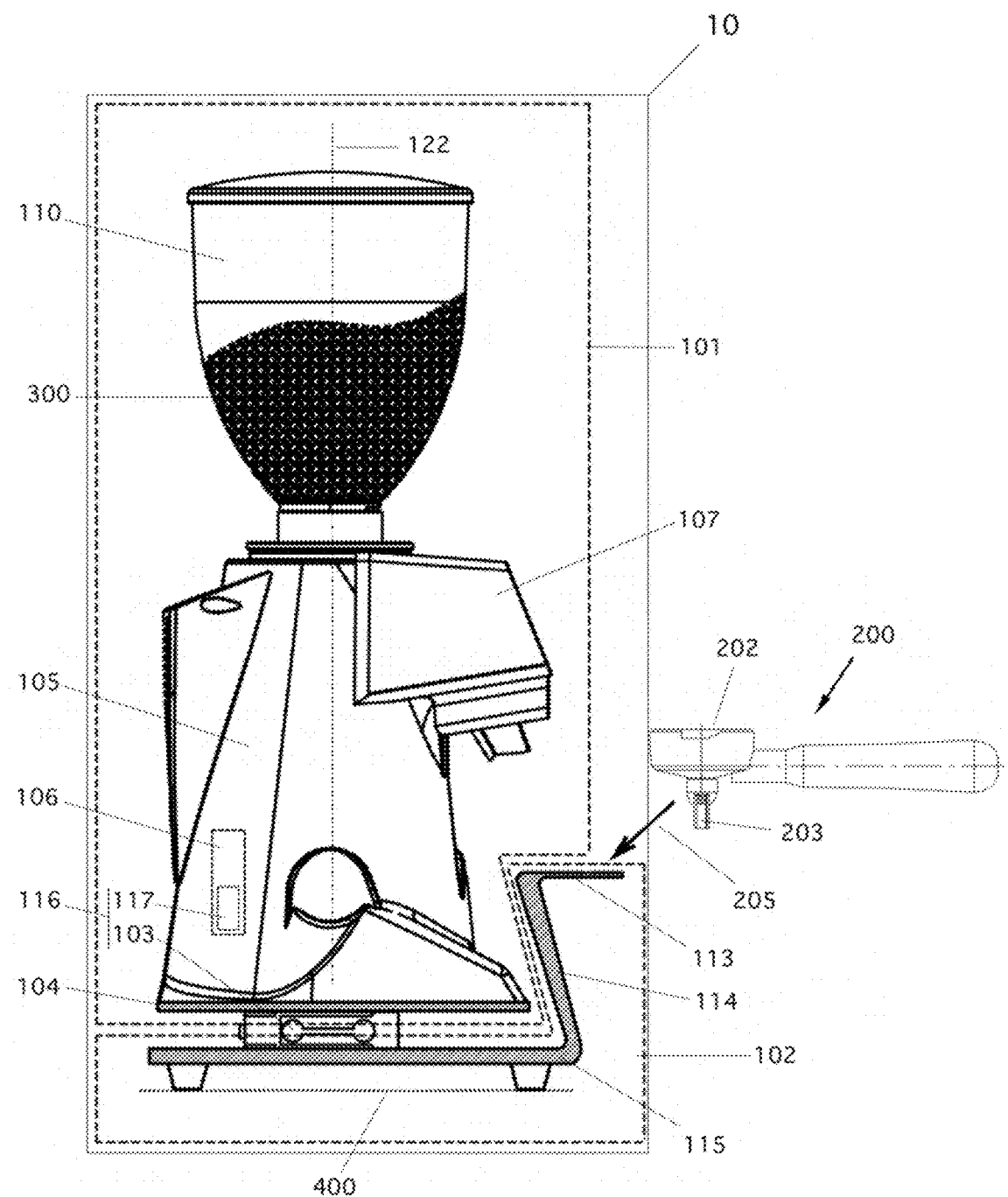
FIG. 2 is a side view of an electronic grinder-doser apparatus of the grind-by-weight type, according to the present invention, wherein the supporting and centering fork of the bowl is made independent of the machine body and of the weighing being coupled with a base that is shaped to such purpose, and with specific execution programs included in the logic control unit of the apparatus. The upper part and the lower part of the apparatus are schematically delimited by a dotted line; obvious and conventional components for the operation of the proposed system, such as wirings, transformers, connectors, push-buttons, etc., are not shown.
Figures 3A, 3B:
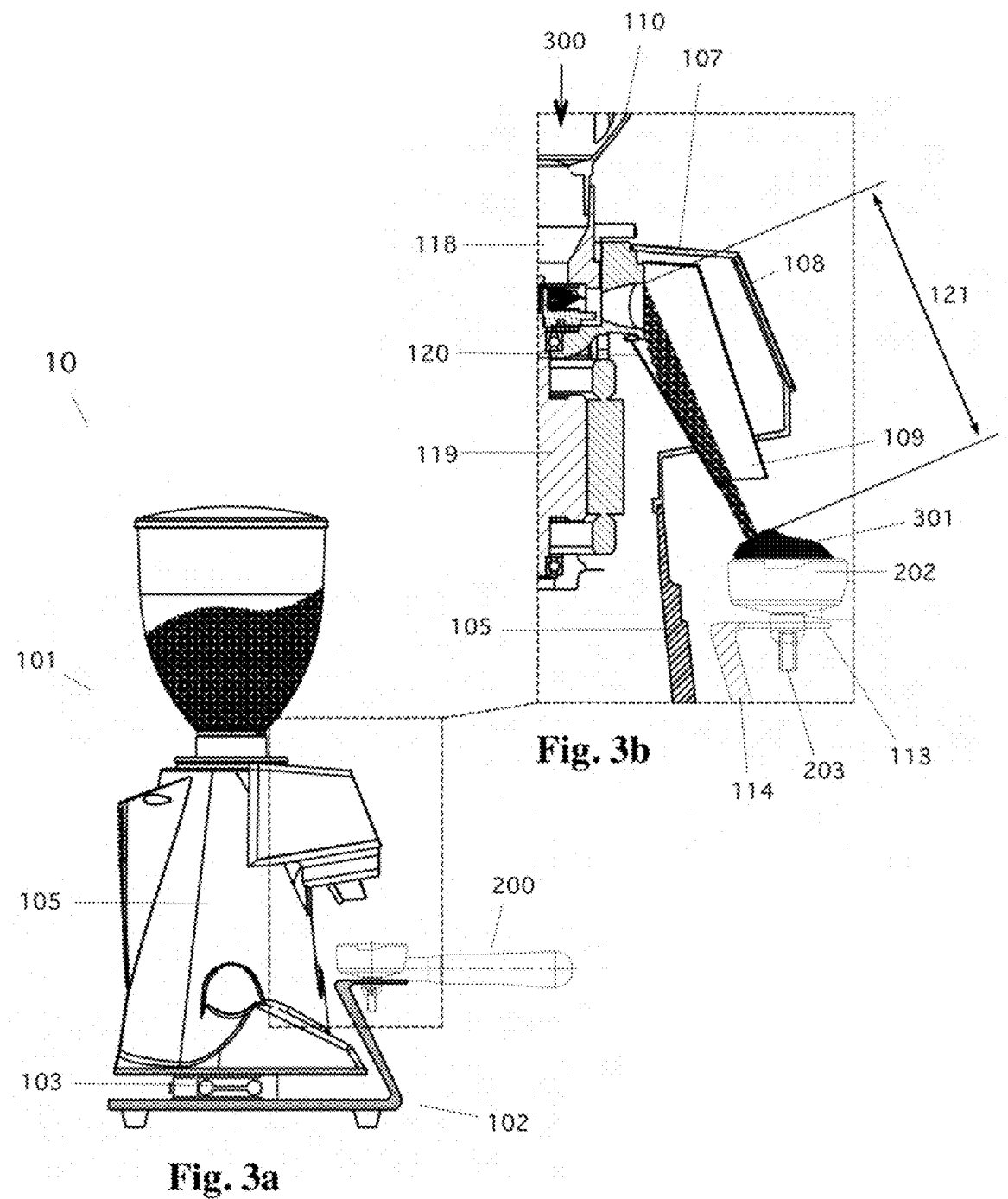
FIGS. 3a and 3b represent the apparatus disclosed by the invention, as in the previous figure, respectively in a side view with the bowl hooked (FIG. 3a) wherein the dotted area refers to the enlarged detail of the dispenser, as in the following figure (FIG. 3b), highlighting the path of the coffee powder between the grinder and the centering fork of the filter-holding bowl, with reference to said residual amount as well.

In more detail as to the realization of said upper part (101), the latter comprises a main body called machine body (105) which comprises the conventional grinding means such as the motor (119), at least one grinder (118), the logic control unit (106) and is also connected to a chute duct (120) that allows for the transit of the ground coffee powder (301) through a dispensing compartment (107) that is frontally joined to said machine body and from which the end thereof exits, like a spout (109) for the dispensing in the filter-holding bowl (200, 202). Preferably, said dispensing compartment comprises at the front a touchscreen (108), acting as a control panel, which is thus connected to said logic control unit (106). Above said machine body (105), in correspondence of the neck (111), a cone-shaped container (110) for the roasted coffee beans (300) is conventionally fastened. For the purposes of the invention, said upper part (101) does not have the conventional supporting and centering fork of the filter-holding bowl (200), which is thus made independent of weighing, being released from the machine body (105) and from the load plane (104) of the cell (103) (FIGS. 2, 3a, 3b). The present description does not contain the conventional elements that are included in the apparatus in any case such as: the electrical wirings, the transformers, the electronic connections, the mechanical fastenings, the structural casing.

It should be noted that said load plane (104) corresponds to the bottom of the machine body (105), it being structurally integral with it; the weight resting on said load plane, and which thus rests on the oscillating side of the cell, corresponds exclusively to the weight of said upper part (101) which is characterised by a barycentric arrangement on its vertical axis (122) passing through the cone (110), the grinders (118) and the motor (119), said weight being substantially central, that is to say, not overhanging, with respect to said plane (104), and is not affected by the hooking and/or release of said bowl (200). The centering fork of the bowl (113), in fact, is obtained in an integral way from said shaped base (102, 103-115) and is constrained to the fixed side of the cell, that is to say, below it. Such a solution (FIGS. 2, 3a) thus involves the hooking (205) of the bowl to a fork (113) that is advantageously integral with the lower part of the apparatus (102). In the known solutions (FIG. 1), on the other hand, the hooking (204) is to a fork (112) that is integral with the upper part (100a) of the apparatus, considerably affecting the validity of the weighing or the calibration of the cell; to this purpose, see for example the prior art drawing.

In more detail as to the realization of said shaped base (102), as disclosed by the invention, it is made up of a portion of base (115) in contact with the support plane (400), which is provided at the front with a protrusion acting as a connector (114) that develops upwards, as a double-bend S-shaped or Z-shaped extension, in such a way as to form in the front end a strong supporting and centering fork (113) for a standard filter-holding bowl (200), reproducing the same hooking configuration and position in use in the professional sector. For example, a filter-holding bowl (200) for espresso coffee bar machines (201), comprising a horizontal handle (201) wherein the small bowl containing the filter (202), for one or two doses, is joined at the end, and wherein below it there are the spouts (203) for dispensing espresso coffee into the cup, is suitable for the invention.

In principle, an electronic weighing means with a horizontal detection plane is used, such as a single point load cell (103), which is intended to precisely detect a weight between 0 and 20 grams measuring variations up to one hundredth of a gram, also considering a high tare weight. Said load cell precisely detects the progressive weight loss of said upper part (101), in correspondence of said load plane (104), making immediately available to said specific execution programs (117), and therefore to the logic control unit (106), at least the exact weighing value in hundredths of a gram. As a non-exhaustive example, a cell of the type marketed by the German company Siemens under the name of Siwarex R Load Cells—Sp Series—in the customized configuration for weights lower than 0.1 Kg and detections up to one hundredth of a gram is suitable for the invention.

It is also observed that the path (121) of the ground powder (301) substantially corresponds to its trajectory from said grinder (118) to the filter in the small bowl (202), and said residual amount (QV) primarily depends on it. Said amount is linked to the inertia of the motor and of the grinder, but above all depends on geometric factors of shape and length of said chute (120), in which temporary accumulation is possible, said accumulation being not constant; therefore, it is necessary to re-calibrate said residual amount every time on the basis of the contextual conditions of the apparatus (10) and of the coffee (301) in transit along said path, continuously maintaining the dispensed dose weight in grams as close as possible to the required one (FIG. 3b).

To this purpose, an electronic weighing device (116) is disclosed, which is integrated in the apparatus (10) and consists of the load cell (103) and of specific execution programs (117) (FIG. 2), in such a way as to automatically detect the weight of each dose during grinding, to stop the motor in such a way as to obtain the desired dose, and at the end of dispensing, too, to control every time the actual dose weight in grams dispensed and consequently re-program the logic unit of the apparatus (106), like automatic calibration. Basically, the proposed weighing device (116, 117, 103) allows to carry out dispensing according to a compensated dose weighing system, of the multi-cycle and feedback type every time, wherein at every cycle of grinding and dispensing of the dose there are two weighings, one with the motor on and one with the motor off with the consequent automatic calibration of the set data, like feedback.

The effectiveness of the proposed solution (10, 116) is particularly connected to the fact that said weighings refer to a substantially barycentric arrangement of the masses resting on the load plane (104) and are not affected by the hooking-release of the bowl (200, 202), which is made independent of the machine body (105) and of the cell (103) by means of said independent fork (113) integral with the base (102), as explained above. In practice, it was observed that in this way one effectively solves the known problem of the incompatibility between the high sensitiveness of detection of the cell and the execution of detection, particularly by eliminating the removable overhanging masses and the consequent stresses and/or accidental impacts.

Basically, by the proposed weighing device (116, 117, 103) grinding is stopped on the basis of the weight planned for stopping by suitably keeping said residual amount into account, wherein such values are re-set every time depending on the variance detected between the desired dose weight in grams and the actual weight of the dose, in such a way as to consequently compensate for the set values with a correction factor (FC), as explained below. To this purpose, said specific dispensing programs (117) include at least two algorithms: a first algorithm called Algorithm A, which executes said double weighing with automatic calibration, and a second algorithm called Algorithm B that filters the vibrations, and/or any other disturbances, at least during weighing with the motor on, that is to say, simultaneously to said first algorithm.

In more detail as to said algorithm A, it consists of 4 steps in sequence (AF1-AF4) intended to complete one single grinding and dispensing cycle, automatically re-setting every time the weight value corresponding to the motor downtime (PF) or stop, and the related amount of product that is dispensed anyway after the motor has been switched off, which is also called residual amount (QV); such weights (PF, QV), being re-calculated on the basis of the variance (SC) detected between the required weight (PR) and the actually dispensed weight (PE), like a compensation, with a particular correction factor (FC). In more detail as to the steps, the following execution is provided in sequence:

first step (AF1): first weighing, with the grinders in operation, with switching-off of the motor upon reaching the motor downtime weight (PF), defined on the basis of the required weight (PR) and of the residual amount (QV) being (PF)=(PR)−(QV);

second step (AF2): second weighing, with the motor off, to check the actually dispensed weight (PE);

third step (AF3): calculation of the variance (SC), being (SC)=(PE)−(PR);

fourth step (AF4): calculation and re-setting of the new residual amount for the following cycle (QVn), compensating for said variance (SC) with a correction factor (FC) preferably of 35/100, that is to say, 0.35 being (QVn)=(QV)+(SC)*(FC).

Said Algorithm B provides that at least during said first step (AF1), in which the load cell (103) detects with the motor on the weight loss of said upper part (101, 300), the motor's vibrations, or other disturbances, are automatically filtered by means of digital filters that can be, alternatively or jointly, of the type called mean value and/or of the type called low-pass. In more detail, the load cell (103) converts the detected weight into an analogue signal, which in its turn is then transformed into a digital number by means of an analogue-digital converter, generally called AD converter, said digital number can be subject to variations caused by fluctuations of the supply of the electronic components and/or by mechanical oscillations that generate a series of weight variations, which alternate between positive and negative. In order to eliminate these problems, therefore, the invention proposes to digitally filter said vibrations and/or oscillations by applying said mean value and/or low-pass filters.

In more detail, said Algorithm B provides two filtering operations (B1, B2), which are carried out alternatively (B1 or B2) or jointly (B1 and B2) with respect to each other, being:
- a first filtering called mean value filtering (B1), where one calculates a mean value of the values acquired in a given period of time, for example with an arithmetic mean;
- a second filtering called low-pass filtering (B2), where one eliminates or diminishes the values of said mechanical oscillations from a given frequency onwards, which is also called a cut-off frequency. It can be seen that the frequency (f) is equal to the opposite of the oscillating period (T), that is to say, f=1/T, where this oscillation period corresponds to the time between two variations of the same sign, both positive or both negative.

EXAMPLE

A practical example is provided below of how the above-described grinder-doser apparatus (10), by means of the proposed weighing device (116), automatically performs each dispensing cycle with real-time weighing and feedback, according to said Algorithm A. For the purpose of explanation and to facilitate understanding, 5 consequential cycles are pointed out, of which the first cycle or Cycle 1 corresponds to the initial setting where the required weight (PR) of the single dose is established, which is of 7.0 g and wherein the first value corresponding to the residual amount (QV1) of 0.5 g is initially supposed, to define the first value corresponding to the motor downtime weight (PF1); such values (QV, PF) being every time automatically re-set for the following cycle, as exemplified below:

Cycle 1
AF1) Calculation and execution of the motor downtime weight: PF1=PR−QV1=7.0 g−0.5 g=6.5 g
AF2) Start of feedback with check of dispensed weight: PE1=7.6 g
AF3) Calculation of the variance: SC1=PE1−PR=7.6 g−7.0 g=0.6 g
AF4) Calculation and re-setting of the following residual amount: QV2=QV1+SC1*FC=0.5 g+0.6 g*0.35=0.5 g+0.21 g=0.71 g
Cycle 2
PF2=PR−QV2=7.0 g−0.71 g=6.29 g
PE2=7.4 g
SC2=PE2−PR=7.4 g−7.0 g=0.4 g
QV3=QV2+SC2*FC=0.71 g+0.4 g*0.35=0.71 g+0.14 g=0.85 g
Cycle 3
PF3=PR−QV3=7.0 g−0.85 g=6.15 g
PE3=7.0 g
SC3=PE3−PR=7.0 g−7.0 g=0 g=exact weight
QV4=−QV3+SC3*FC=0.85 g+0 g*0.35=0.85 g
Cycle 4
PF4=PR−QV4=7.0 g−0.85 g=6.15 g
PFA=6.5 g
SC4=PE4−PR=6.5 g−7.0 g=−0.5 g
QV5=QV4+SC4*FC=0.85 g+(−0.5 g*0.35)=0.85 g−0.175 g=0.675 g
Cycle 5
PF5=PR−QV5=7.0 g−0.675 g=−6.325 g
PE5=7.0 g
SC5=PE5−PR=7.0 g−7.0 g=0 g=exact weight
QV6=QV5+SC5*FC=0.675 g+g*0.35)=0.675 g It can be seen that, if the dispensed weight (PE) is lower than the required weight (PR), the residual amount (QV) of the following cycle will thus be lower, in such a way that the downtime weight (PF) will be greater; vice versa, if the dispensed weight is greater, said residual amount will be increased, in such a way that the motor at the following dispensing stops at a lower weight. Said correction factor (FC) is statistically determined in such a way as to compensate for the excessive variances due to accidental causes; therefore, it was experimentally verified that a value of about 0.35 is effective in the use provided by the invention.

To conclude, thanks to the structural configuration with an independent filter-holding bowl, preferably integrated into the base of the apparatus, the cell is protected from the known problems of impacts or torsions due to the continuous engagement and release of the filter-holding bowl, which sometimes decalibrate and/or damage the sensitiveness of the cell itself. Therefore, it is possible to progressively detect weight (AF1) during grinding, that is to say, in real time, and it is also possible to perform a following weighing (AF2) of check with the motor off without handling the apparatus, to then calculate (AF3) and consequently and automatically re-set (AF4) the setting values in such a way as to get closer and closer to the desired dose weight in grams, like feedback. Basically, the cell (103) detects by difference the progressive weight loss of the mass (101) that rests in a barycentric way on the load plane (104) and stops the motor upon reaching the set nominal weight from which the amount of coffee dispensed by inertia after the grinders have been stopped, that is to say, said residual amount (QV), is opportunely subtracted, which is experimentally determined every time as explained above by means of a correction factor (FC); then, with the motor off, the same cell checks the actually dispensed weight (PE) and consequently executes said feedback, wherein, in case there is a variance (SC), that is to say, discordance, between the required dose and the dispensed dose because of interventions or external factors, such as the adjustment of grinding, air humidity or other variables, by means of automatic processing it modifies said residual amount for the following cycle.

Therefore, a complete grinding cycle with feedback performed by the apparatus (10) according to the invention, in daily professional use, is as follows: the operator constrains a filter-holding bowl (200) to the independent centering fork (113) then, by pushing the motor's start button (119), the operator activates the grinders that begin to dispense the coffee powder, the system (10, 116) instantaneously activates said real-time weighing that continuously checks the weight of the dispensing. The motor stops upon reaching the downtime weight (PF), which corresponds to the required dose (PR) from which said residual amount (QV) was opportunely subtracted; then the grinder-doser apparatus continues to dispense said residual amount, thus obtaining the required dose. The operator removes the filter-holding bowl and the apparatus starts said feedback by controlling the actually dispensed weight (PE) and, if there is said variance (SC) between the required dose weight in grams and the dispensed dose weight in grams, re-calculation is activated with compensation and automatic calibration, that is to say, the re-setting for the following cycle of said downtime weight (PF) and residual amount (QV).

Therefore, in practice it was observed that the proposed solution efficiently simplifies the operator's professional activity, reducing the operator's physical and mental fatigue while providing a greater quality of the service as well, the grinder-doser apparatus (10) being constantly calibrated in such a way as to automatically stop grinding and obtain the desired dose with precision.

REFERENCE

(10) electronic grinder-doser apparatus for coffee in beans of the type called "grind-by-weight", as provided by the present invention;
(100a) upper part of the apparatus, as in the known prior art;
(100b) base, in contact with the support plane and corresponding to the lower part of the apparatus, as in the known prior art;
(101) upper part of the apparatus, according to the invention;
(102) shaped base constituting the lower part of the apparatus, according to the invention;
(103) load cell;
(104) load plane resting on the cell, corresponding to the bottom of the machine body;
(105) machine body;
(106) logic control unit of the apparatus and of the cell;
(107) dispensing compartment;
(108) touchscreen acting as a control panel;
(109) spout for dispensing the ground coffee in the filter;
(110) cone-shaped container for the roasted coffee beans;
(111) neck;
(112) conventional supporting and centering fork of the bowl;
(113) independent fork with respect to the machine body, base portion acting as a supporting and centering element of the bowl;
(114) base portion acting as a connector;
(115) base portion in contact with the support plane, below the cell;
(116) weighing device, according to the invention;
(117) specific weighing execution programs, including at least: one first dispensing algorithm and a second filtering algorithm;
(118) grinder;
(119) motor;
(120) chute duct;
(121) path of the ground powder between the grinder and the bowl;
(122) vertical axis of the barycentric type, passing through the cone, the grinders, the motor and the load plane of the cell;
(200) filter-holding bowl, completely assembled;
(201) handle;
(202) small bowl containing the filter;
(203) spouts for dispensing espresso coffee into the cup;
(204) hooking to the fork in the upper part of the apparatus, as in the known prior art;
(205) hooking to the fork in the lower part of the apparatus, independently of the weighing, as provided by the present invention;
(300) roasted coffee beans;
(301) ground coffee;
(400) support plane;
(AF) Steps of execution of the Algorithm A, which are in sequence: (AF1) Calculation and execution of the motor downtime weight, (AF2) Start of feedback with check of the dispensed weight, (AF3) Calculation of the variance, (AF4) Calculation and re-setting of the following residual amount;
(B1, B2) Filtering operations of the Algorithm B, which are alternatively or jointly: mean value filtering (B1) and/or low-pass filtering (B2);
(FC) Correction factor;
(PE) Dispensed weight;
(PF) Motor downtime weight;
(PR) Required weight for the dose, it is a fixed value and corresponds to the desired dose weight in grams, it is established by the operator by means of the control panel;
(SC) Variance;
(QV) Residual amount, it is the amount of product dispensed after the motor has been switched off.

The invention claimed is:
1. A grinder-doser apparatus for controlling a weight of ground and dosed coffee beans so as to dispense ground coffee beans into a filter-holding bowl for espresso coffee, the grinder-closer apparatus comprising:
a weighing device with a load cell and adapted to weigh a dose in real-time during the dispensing and to automatically control an actually dispensed dose weight;
an upper part;
a lower part, the load cell being interposed between said upper part and said lower part, the load cell progressively detecting of said upper part, wherein said upper part comprises:
a machine body having a grinder and a motor;
a front dispensing compartment crossed by a chute duct, the chute duct having a dispensing sport at a front end thereof;
a screen acting as a control panel; and
a cone-shaped container adapted to receive roasted coffee beans and positioned above said machine body;
an electronic controller having a logic control unit connected to said screen and to the motor and to the load cell so as to transfer data to said screen and to the motor and to the load cell, the load cell and said logic control unit adapted to dispense a desired dose by stopping the motor before a required weight is reached;
a hooking for the filter-holding bowl being independent of said weighing device, said hooking being constrained to said lower part below the load cell, said lower part being a base shaped so as to integrate a supporting and centering fork independent of said upper part, the supporting and centering fork having a barycentric configuration on a detection plane of the load cell with a vertical axis passing through said cone-shaped container and through the grinder and through the motor, wherein said weighting device has execution programs loaded into the logic control unit so as to execute a double weighing with continuous feedback at each grinding cycle according to the first algorithm and a second algorithm, the first algorithm providing at least one first real-time weighting during grinding wherein the motor is stopped in advance of reaching the required weight so as to consider a variable amount of the ground coffee beans that corresponds to a residual amount and is automatically modifiable at each grinding cycle and a second weight with the motor stopped so as to determine an actual dispensed dose and a variance with respect to the required dose weight value corresponding to a motor downtime during the at least one first weighting, the second algorithm being active during the at least one first weighing so as to filter out mechanical vibrations of the motor.

2. The grinder-doser apparatus of claim 1, wherein the first algorithm has four execution steps in sequence as follows:
- a first step of calculating and executing a motor downtime weight with real-time weighing with the motor on, wherein the residual amount is variable;
- a second step of checking the weight of the actually dispensed dose;
- a third step of calculating the variance; and
- a fourth step of calculating and resetting a new residual amount to be used in the first step of a following cycle, the new residual amount depending on the variance and compensated for by a correction factor of 0.35 with a tolerance of plus or minus 20%.

3. The grinder-doser apparatus of claim 1, wherein the second algorithm provides at least two filtering operations, one of the at least two filtering operations calculating a mean value of values acquired in a given period of time, another of the at least two filtering operations being a low-pass filter that eliminates or reduces a value of the mechanical vibration from a given frequency.

4. A real-time weighting system with continuous feedback for automatic calibration, the real-time weighing system being of a multi-cycle type for a grinder-doser apparatus, the grinder-doser apparatus for grinding and dosing coffee into a filter-holding bowl for espresso coffee, the grinder-doser apparatus comprising:
- an upper part;
- a lower part being a base and having an electronic load cell thereon, the electronic load cell interposed between said upper part said lower part, wherein said upper part comprises:
  - a logic control unit; and
  - a machine body with a grinder and a dispenser, said machine body having a cone-shaped container for the coffee, wherein said logic control unit is connected to the electronic load cell so as to define an electronic weighing device integrated into the grinder-doser apparatus, the real-time weighing system comprising:
- a hooking of the filter-holding bowl constrained below the electronic load cell by the base, said hooking integrating a centering fork; and
- a plurality of execution programs loaded in the logic control unit so as to execute a double weighing with continuous feedback at every cycle in accordance with the following steps:
  - constraining the filter-holding bowl to the centering fork;
  - pressing a start button so that the motor activates the grinder so as to begin to grind coffee, wherein the real-time weighing system instantaneously activates a first real-time weighing that checks a weight of the dispensing continuously;
  - stopping the motor upon reaching a downtime weight corresponding to a required dose from which a variable amount of coffee dispense after stopping the motor is subtracted;
  - removing the filter-holding bowl;
  - starting the feedback by controlling an actually dispensed weight; and
  - recalculating with compensation and automatic calibration if there is a variance between the required dose and the actually dispensed weight.

5. The real-time weighting system of claim 4, wherein said plurality of execution programs has a first algorithm and a second algorithm, the first algorithm executing sequentially the steps of:
- calculating and executing a motor downtime weight;
- checking an actually dispensed weight with the motor stopped;
- calculating the variance; and
- calculating and resetting a new residual amount for use in the step of calculating and executing depending on the variance and compensated by a correction factor of 035 with a tolerance of plus or minus 20%, wherein the second algorithm is active at least during the weighing while the grinder is in operation so as to filter mechanical vibration of the motor by performing at least one of two filtering operations, one of the two filtering operations being a mean value filtering that calculates a mean value of values acquired in a given period of time, another of the two filtering operations being a low-pass filtering that eliminates or diminishes a value of the mechanical vibrations from a given frequency onwards.

* * * * *